United States Patent
Stutsman

(10) Patent No.: US 7,281,331 B1
(45) Date of Patent: Oct. 16, 2007

(54) SPINDLE ASSEMBLY FOR MACHINE TOOLS AND METHOD OF FABRICATING SAME

(75) Inventor: David A Stutsman, Huntingburg, IN (US)

(73) Assignee: Thermwood Corporation, Dale, IN (US)

( * ) Notice: Subject to any disclaimer, the term of this patent is extended or adjusted under 35 U.S.C. 154(b) by 1826 days.

(21) Appl. No.: 09/290,777

(22) Filed: Apr. 13, 1999

(51) Int. Cl.
*B23P 21/00* (2006.01)
*B23C 1/00* (2006.01)

(52) U.S. Cl. ............ 29/898.07; 29/434; 409/231; 409/131; 409/233; 384/537

(58) Field of Classification Search .......... 409/231, 409/233, 131; 29/898.07, 434; 384/537; 408/239 R; 82/147
See application file for complete search history.

(56) References Cited

U.S. PATENT DOCUMENTS

| | | | | |
|---|---|---|---|---|
| 1,761,841 A | * | 6/1930 | Nenninger | 409/231 |
| 3,058,559 A | * | 10/1962 | Ohrnberger | 192/91 R |
| 4,815,903 A | * | 3/1989 | Skidmore, Sr. | 409/231 |
| 4,854,750 A | * | 8/1989 | Lavin | 384/500 |
| 5,096,347 A | * | 3/1992 | Kumagai et al. | 409/233 |
| 5,305,525 A | * | 4/1994 | Susnjara et al. | 409/231 |
| 5,471,724 A | * | 12/1995 | Susnjara et al. | 409/231 |
| 5,878,475 A | * | 3/1999 | Stutsman | 29/434 |

OTHER PUBLICATIONS

Nelson, C., Millwrights and Mechanics Guide, 4th ed., pp. 316-318.*
Machinery's Handbook, 25th ed., New York, 1996, pp. 2378-2379.*

* cited by examiner

*Primary Examiner*—Erica Cadugan
(74) *Attorney, Agent, or Firm*—Stevens, Davis, Miller & Mosher, LLP

(57) ABSTRACT

A spindle assembly for a machine tool comprising a housing having at least one bearing seat, a bearing having inner and outer races mounted in the bearing seat, a sleeve disposed between a race of the bearing and the housing, adhesively bonded to the housing, and a spindle mounted on the other race of the bearing wherein the spindle is axially aligned relative to the bearing and the spindle and bearing are displaceable axially relative to the sleeve rigidly secured to the housing.

19 Claims, 2 Drawing Sheets

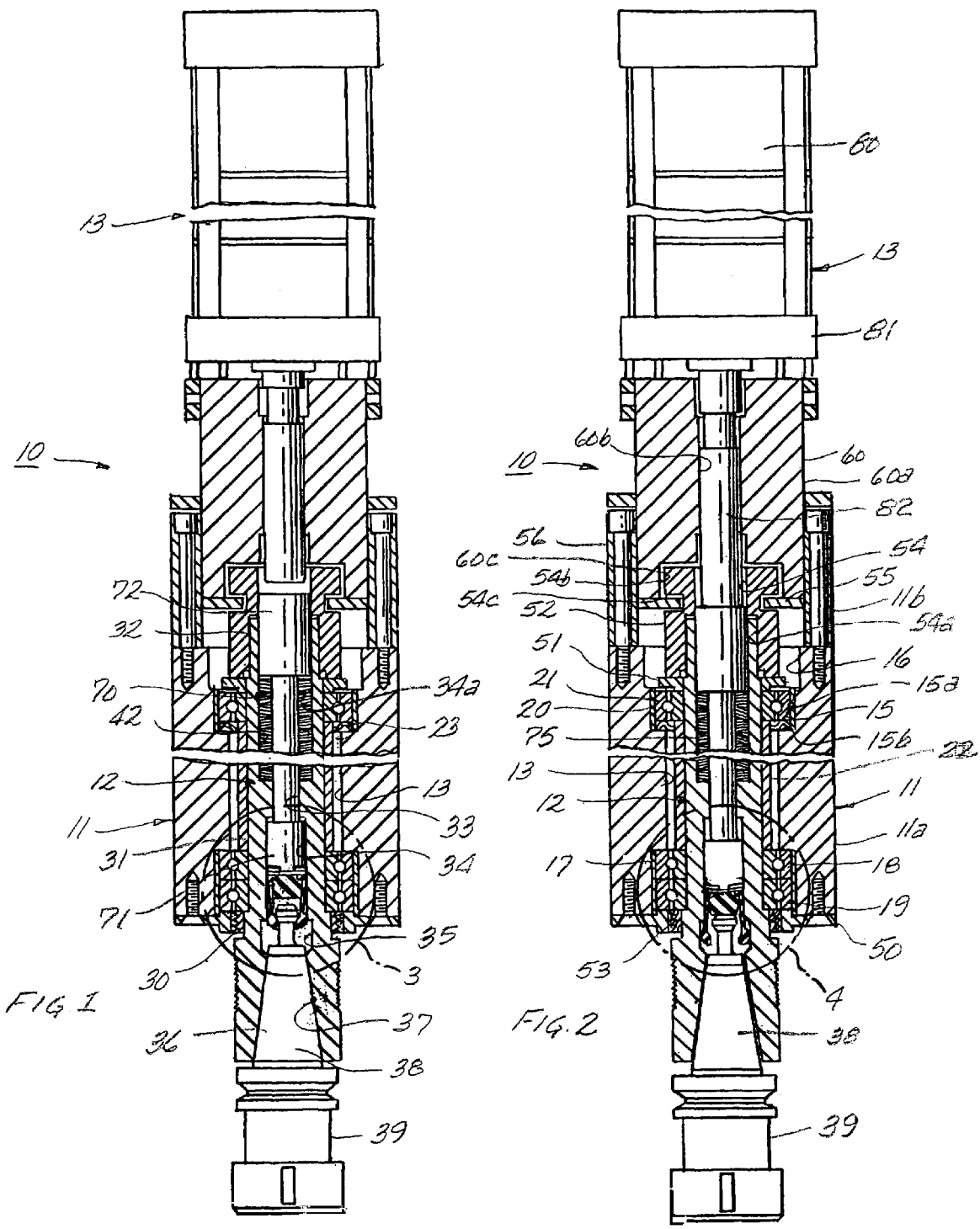

SPINDLE ASSEMBLY FOR MACHINE TOOLS AND METHOD OF FABRICATING SAME

This invention relates to machine tools and more particularly to an improved spindle assembly for such machines. This invention further contemplates a method of fabricating such a spindle assembly.

BACKGROUND OF THE INVENTION

Spindle assemblies used in machine tools for machining wood, plastic and nonferrous materials typically include a housing mounted on a vertically displaceable toolhead support assembly, a pair spaced roller bearings mounted in the housing and a spindle journaled in the bearings. The outer races of the bearings usually are seated in bearing seats machined in the ends of the spindle housing. Drive is transmitted to the spindle by means of a belt drive connected to a lower depending portion of the spindle. Such spindles generally are operated at speeds in the range of 10,000 to 20,000 rpm.

In such assemblies, it has been found that if the bearing seats are not precisely concentric so that the spindle is coaxial with the bearings, laterally directed loads produced by the high speed rotation of the spindle will create an axis of inertia that is nonparallel to the axis of rotation of the spindle, resulting in undue wear of the bearing seats, the bearing roller balls and/or the spindle. Such condition ultimately leads to malfunctioning and often failure of the assembly.

Such problem in spindle assemblies has been addressed and largely overcome by the solution described and claimed in U.S. Pat. No. 5,305,525. The solution provided there consists of forming a pair of bearing seats in the spindle housing slightly oversized relative to the outer dimensions of the bearings, mounting a first bearing on the spindle, applying an adhesive bonding material on the outer race of the first bearing and a first bearing seat in the spindle housing, inserting the spindle with the first bearing mounted thereon into the housing so that the outer race of the first bearing is seated on the first bearing seat, applying an adhesive bonding material to the second bearing seat and the outer race of the second bearing, mounting the second bearing on the other end of the spindle while inserting the second bearing in the second bearing seat and then allowing the bonding materials to set, assuring an axial alignment of the spindle and bearings.

The procedure of aligning the spindle with the bearings and then securing the outer races of the bearings in their respective bearing seats in the spindle housing has greatly improved the operation and longevity of the spindle and bearings in such assemblies. It further has been found, however, that such assembly procedure and resulting construction providing for an accurate alignment of the spindle and bearings has not provided for the axial displacement of the spindle within the spindle housing, normally caused by heat developed in the operation of the spindle at considerably high speeds. It thus has been found to be desirable to provide a spindle assembly of the type described which not only provides for a proper alignment of the spindle and the bearings but further allows for the axial displacement of the spindle relative to the spindle housing when the spindle is rotating at high speeds.

SUMMARY OF THE INVENTION

The present invention provides for a spindle assembly for a machine tool generally comprising a housing having at least one bearing seat, a bearing having inner and outer races, a sleeve disposed between a race of the bearing and the housing, bonded to the housing and a spindle mounted on the other race wherein the spindle is axially aligned relative to the bearing and the spindle and bearing are displaceable axially relative to the sleeve. Preferably, the assembly is formed by a method comprising forming a bearing seat in the spindle housing, mounting the bearing on the spindle so that one of the races engages the spindle, mounting the sleeve on the other of the races of the bearing mounted on the spindle so that the bearing and the spindle are displaceable axially relative to the sleeve, applying a bonding material to at least one of a surface of the sleeve and a surface of the bearing seat, mounting the spindle with the bearing and sleeve as a unit on the housing so that such surface of the sleeve is disposed adjacent the surface of the bearing seat with the bonding material adjoining such surfaces and then allowing the bonding material to set to rigidly secure the sleeve to the housing, permitting the bearing and the spindle to displace along an axial line of travel relative to the sleeve and housing.

In a more specific embodiment of the invention, the assembly is formed by providing a housing having an axial opening therethrough formed with axially spaced, first and second enlarged sections providing outwardly facing annular seating surfaces and annular side walls slightly oversized relative to the annular sleeves to be received therein, mounting a first annular sleeve on the outer race of a first bearing having inner and outer races so that the first bearing is axially displaceable relative to the first sleeve, mounting the first bearing with the first sleeve disposed thereon onto the spindle having an annular seating surface so that the inner race of the first bearing seats on the annular surface of the spindle, applying an adhesive bonding material to at least one of the surface of the first sleeve and the annular side wall of the first enlarged section of the housing opening, inserting the spindle with the first bearing and first sleeve disposed thereon into the housing opening so that first bearing is received in the first enlarged section, the outer race of the first bearing is seated on the annular surface of the first enlarged section and the annular sleeve is disposed adjacent the annular side wall of the first enlarged section, with the bonding material disposed therebetween, mounting a second annular sleeve on the outer race of the second bearing having inner and outer races so that the second bearing is axially displaceable relative to the second sleeve, applying an adhesive bonding material to at least one of the surface of the second sleeve and the annular side wall of the second enlarged section of the housing opening, mounting the second bearing with the second sleeve disposed thereon on the spindle disposed in the housing opening so that the second bearing is received in the second enlarged section, the outer race of the second bearing is seated on the annular surface of the second enlarged section and the second sleeve is disposed adjacent the annular side wall of the second enlarged section, with the bonding material disposed therebetween and then allowing the bonding materials to set to rigidly secure the sleeves to the housing, permitting the spindle and the first and second bearings to displace axially relative to the housing.

BRIEF DESCRIPTION OF THE DRAWINGS

FIG. 1 is a vertical cross section of an embodiment of the invention, illustrating the assembly gripping a tool holder and having portions thereof broken away;

FIG. 2 is a view similar to the view shown in FIG. 1, illustrating the assembly in a condition having released the tool holder;

DESCRIPTION OF THE EMBODIMENT OF THE INVENTION

Figure 3:
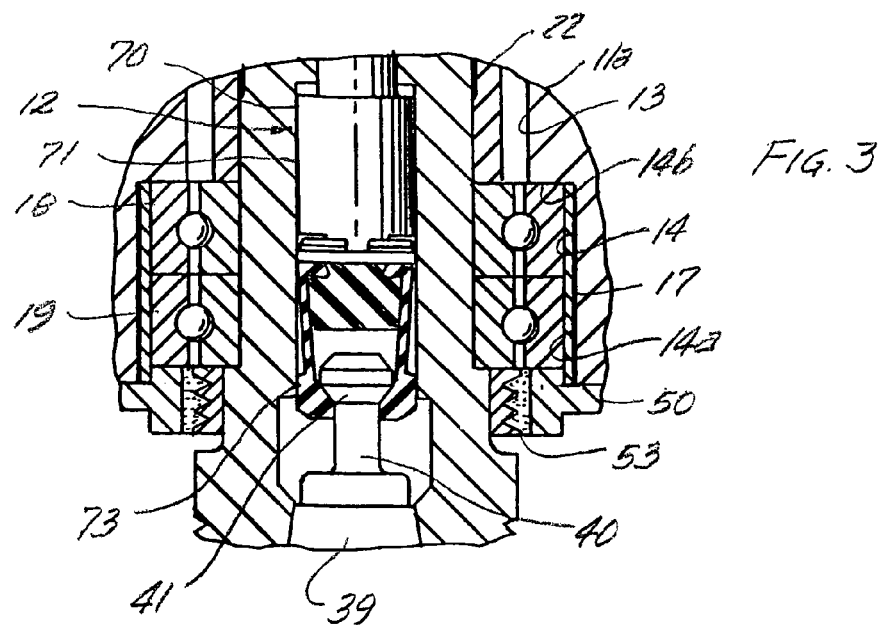
FIG. 3 is an enlargement of the designated portion of the assembly shown in FIG. 1.
Figure 4:
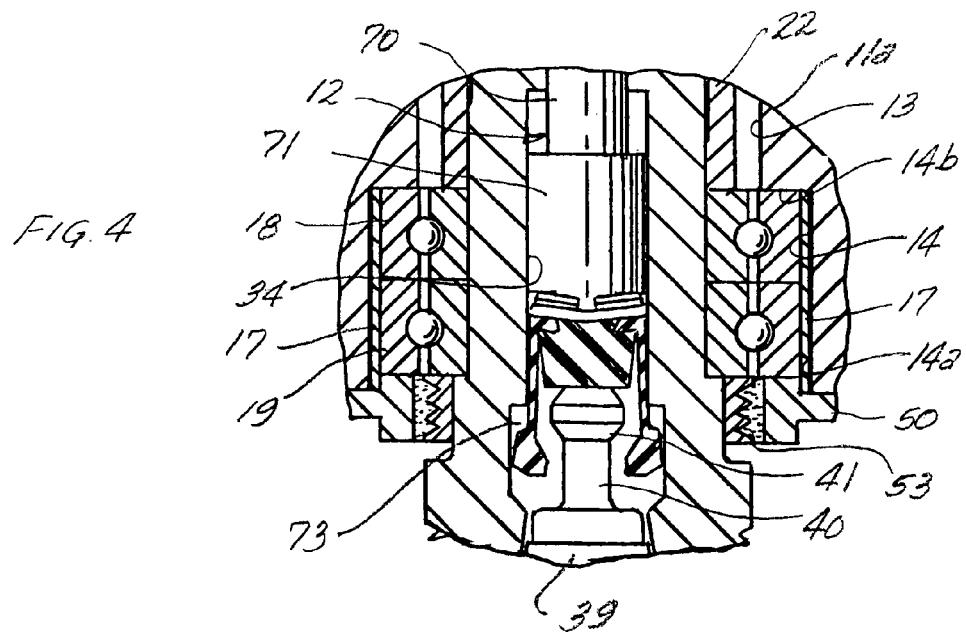
FIG. 4 is an enlargement of the designated portion of the assembly shown in FIG. 2.

Referring to the drawings, there is illustrated a spindle assembly 10 comprising a component of a toolhead assembly for a machine tool, generally consisting of a housing 11, a spindle 12 mounted in the housing and a cylinder assembly 13. The housing is provided with a lower section 11a and an upper section 11b. Housing section 11a is provided with a cylindrical bore 13 therethrough having a first enlarged section 14 at a lower end thereof, a second enlarged section 15 and a third enlarged section 16 at the upper end thereof. As best seen in FIGS. 3 and 4, enlarged bore section 14 provides a bearing seat including an annular wall 14a and annular seat 14b. Enlarged section 15 also provides a bearing seat including an annular side wall 15a and an annular seating surface 15b. Provided in enlarged section 14 is a cylindrical sleeve 17 having the outer cylindrical surface thereof adhesively bonded to annular wall surface 14a of the housing. A pair roller bearings 18 and 19 are seated in enlarged bore section 14 with the outer surfaces of the outer races thereof engaging the inner annular surface of cylindrical sleeve 17 and an annular end surface of outer race 18 engaging annular surface 14b of enlarged bore section 14. Similarly, a cylindrical sleeve 20 is disposed in enlarged bore section 15 with the outer cylindrical surface thereof adhesively bonded to the annular side wall surface 15a of enlarged bore section 15. Disposed within cylindrical sleeve 20 and axially displaceable relative thereto is a roller bearing 21. The inner races of bearings 18 and 21 are maintained in axially spaced relation by means of a spacer tube 22. A spring washer 23 is provided between the outer race of bearing 21 and annular surface 15b of enlarged bore section 15.

Spindle 12 has a generally tubular configuration and is journaled in lower bearings 18 and 19 and upper bearing 21. Outer cylindrical surface 30 is provided with a recessed cylindrical section 31 providing an annular shoulder on which the inner race of bearing 19 is seated, and an upper threaded portion 32. It further is provided with an axially disposed bore 33 having a lower, first enlarged section 34 and a second enlarged section 35 opening into an end portion 36 provided with a diverging, conically configured wall 37 adapted to receive an upper portion 38 of a tool holder 39, provided with a complimentary conical surface relative to surface 37. As best shown in FIGS. 3 and 4, the upper end of the tool holder is provided with a neck portion 40 and a head portion 41 received within enlarged bore section 35 of the spindle. The upper end of axial bore 33 is provided with an enlarged section 42.

The bearings and the spindle journaled in the bearings are retained within the housing with the bearings seated within enlarged bore sections 14 and 15 by means of a lower cover plate 50, a bearing washer 51 and a jam nut 52. Cover plate 50 has an annular configuration and is secured to the bottom end of housing 11 by a set of screws. An inner end of plate 50 engages the outer race of bearing 19 and is provided with a seal 53 engaging the spindle about the periphery thereof. Bearing washer 51 also has an annular configuration and has a depending, annular portion which engages the inner race of bearing 21. Jam nut 52 is provided with an axial bore 54 having an enlarged, threaded section 54a threaded onto the upper threaded end of the spindle so that it engages bearing washer 51 which bears on the inner race of bearing 21. Outer annular surface 54b of the jam nut is provided with an annular recess 54c which is adapted to receive a pair of semi-circular retaining flanges 55.

Upper housing section 11b has a cylindrical configuration and is adapted to seat on and be secured to the upper end of lower housing section 11a by means of a set of bolts 56. Such section is axially aligned with axial bore 13 of lower housing section 11a. Mounted within upper housing section 11b is a floating cylinder mount 60 provided with an axially disposed bore 60a aligned axially with lower housing bore 13 and spindle 12, having a lower enlarged section 60c which receives the upper end of jam nut 52. Axial displacement of the cylinder mount is restricted relative to the spindle by means of retainer plates 55 which are secured to the underside of the cylinder mount by means of the set of screws and which project into annular grove 54c of jam nut 52.

Axially displaceable in spindle bore 33 is a draw bar 70 having a lower enlarged section 71 disposed in enlarged spindle bore section 34 and an upper enlarged section 72 received in an upper enlarged section 34a of spindle bore 33. As best shown in FIGS. 3 and 4, a collet 73 is provided on the lower end of enlarged draw bar section 71 having a set of fingers which are adapted to cam inwardly when the draw bar is urged in an upward direction to grip head portion 41 of the tool holder as shown in FIG. 3, and to spring apart when the draw bar is moved in a downward direction to release the head portion of the tool holder as shown in FIG. 4. The draw bar is urged into the upper position as shown in FIG. 3 by means of a set of spring washers 75 disposed between an annular shoulder provided by enlarged spindle bore section 34a and a lower cylindrical surface of enlarged draw bar section 72.

Cylinder assembly 13 includes a cylinder 80 retained in a frame 81 secured to the upper end of cylinder mount 60 and a rod member 82 which extends through bore 60b of the cylinder mount in axial alignment with draw bar 70. When rod member 82 is in the retracted position as shown in FIGS. 1 and 3, it will be out of engagement with enlarged draw bar section 72 so that spring washers 70 will urge the draw bar into an upper position causing the fingers of the collet to be cammed inwardly and grip head portion 41 of the tool holder and correspondingly secure the tool holder to the spindle for performing a machining function. When the rod member is extended as shown in FIG. 2, the rod member will engage and downwardly displace the draw bar against the biasing action of spring washers 75, allowing the fingers of collet 73 to spring apart and thus release the head portion of the tool holder, allowing it to be removed from the lower end of the spindle. The detachment of rod member 82 from draw bar 70 permits the draw bar to rotate as part of the spindle assembly during machining operations.

Typically, a drive motor will be mounted on the tool head assembly and drive is transmitted from the motor to the spindle by means of a drive belt interconnecting a suitable pulley mounted on the drive motor output shaft and a pulley mounted on the lower, exposed portion of the spindle.

Draw bar 70 is of a two piece construction in order to facilitate assembly. Lower enlarged section 71 with support collet 73 may be formed separately from the intermediate and upper sections with the lower end of the intermediate section being threaded so that it may be threaded into a threaded opening of section 71.

In assembling the embodiment as described, enlarged draw bar section 71 with the collet attached thereto is inserted through the lower end of the spindle, spring washers 75 are inserted in the upper end of the spindle, so that the other section of the draw bar is inserted into the upper end of the spindle so that the lower end thereof extends through the washers and a section of the spindle and is threaded into the draw bar section 71 disposed in enlarged section 43 of the spindle bore. Upon releasing any axial force on the draw bar, the biasing action of the spring washers will urge the draw bar into the position as shown in FIG. 1. Cylindrical sleeve 17 is then mounted on lower bearings 18 and 19 and such assembly is then press fit unto the lower end of the spindle. With the lower bearings and associated sleeve thus mounted on the lower end of the spindle, an adhesive bonding material is applied to either or both the outer surface of sleeve 17 and on annular side wall 14a of enlarged bore section 14, and the spindle with bearings 18 and 19 and sleeve 17 mounted thereon is inserted into the lower end of housing 11 so that the bearings are received in enlarged bore section 14, the end of the outer race of bearing 18 engages annular surface 14b of enlarged bore section 14 and the outer surface of sleeve 17 is disposed in opposed relation to annular side wall surface 14a of enlarged bore section 14, with the bonding material disposed therebetween.

With the spindle and lower bearings 18 and 19 thus inserted and mounted in the housing, tubular spacer 22 is inserted through the upper end of the lower housing opening and thus mounted on the spindle with the lower edge thereof engaging the inner race of bearing 18, and a wavy spring is positioned on annular surface 15b of enlarged housing bore 15, about the upper end of spacer tube 52. Cylindrical sleeve 20 is then mounted on bearing 21, and an adhesive bonding material is applied to either or both of the outer surface of sleeve 20 and annular side wall 15a of enlarged section 15 and the bearing and sleeve are mounted on the upper end of the spindle and inserted into enlarged opening 15 so that the inner race of bearing 15 engages the upper end of spacer tube 22 and sleeve 20 is disposed in opposed relation to annular side wall 15a of enlarged bore section is with the adhesive bonding material therebetween. With the bearing and sleeve thus positioned, bearing washer 51 is slipped over the upper end of the spindle and seated on the inner race of bearing 21 and jam nut 52 is threaded onto the upper end of the spindle into engagement with bearing washer 51 to secure the bearings in enlarged openings 14 and 15. Under such conditions, the spindle and the bearings will be properly aligned and the adhesive bonding material disposed between sleeves 18 and 20 is allowed to set and thus fix the proper alignment of the spindle with the bearings.

With the spindle and bearings thus firmly mounted and properly aligned within lower housing section 11a, floating cylinder mount 60 is mounted on jam nut 52 so that the upper end of the jam nut is received in recess 60c and bore 60b is disposed axially with the spindle. Retainer plates 55 are then inserted with their inner edges in annular recess 54c of the jam nut, against the under side of the cylinder mount, and are secured thereto by a set of screws inserted in openings in the plate members and registered, threaded holes in the bottom of the cylinder mount. The upper housing section is then mounted by slipping it over the cylinder mount and securing it to the lower housing section by means of bolts 56.

The cylinder assembly is then mounted by positioning the cylinder support frame on the upper end of the cylinder mount with rod member 82 extending through cylinder mount bore 60b, and then securing the cylinder support frame to the upper end of the cylinder mount.

When the assembly is thus completed, the assembly may be mounted on the tool head support assembly of the machine, a pulley may be mounted on the lower depending portion of the spindle, a drive belt may be installed between the drive motor and the spindle and the air lines of cylinder 80 may be connected to a pressurized air supply with suitable controls.

In forming the bearing seats in the spindle housing, the annular side walls of the enlarged spindle bore sections are oversized slightly relative to the outside diameters of the bearing sleeves, preferably in the range of 0.010 to 0.015", the sleeves are formed of steel and the adhesive bonding material may consist of any suitable metal-to-metal adhesive material such as an epoxy resin.

By mounting the bearings on the shaft prior to securing the outer races of the bearings to the housing, the spindle and bearings are allowed to align themselves properly. When the position of the outer bearings is then fixed relative to the spindle housing, the alignment of the spindle with the bearings will be maintained. Furthermore, by inserting the bearings in the bearing sleeves and rigidly securing the bearing sleeves to the housing, the spindle will not only be properly aligned relative to the bearings but will be permitted to displace axially within the confines of the bearing sleeves, due to expansion caused by heat generated during the high speed operation of the spindle.

In the normal operation of the spindle assembly to perform a machine function, the tool holder will be received in the lower end of the spindle and firmly gripped by the collet formed on the lower end of draw bar, and the spindle with the tool holder will be free to rotate relative to the housing, the cylinder mount and the cylinder assembly, as shown in FIG. 1. When it is desired to change the tool, the spindle drive is discontinued, suitable controls are operated to supply air under pressure to the base end of cylinder 80 to extend rod member 82 into engagement with the draw bar against the biasing action of spring washers 75, thus causing the collet to displace downwardly and permit the gripping fingers thereof to spring outwardly, releasing the tool holder. A new tool then may be inserted into the lower end of the spindle and the cylinder assembly operated to allow the draw bar to displace upwardly under the biasing action of the spring washers thus causing the gripping fingers of the collet to be cammed inwardly and grip the upper end of the tool holder.

From the foregoing detailed description it will be evident that there are a number of changes, adaptations, and modifications for the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A spindle assembly for a machine tool comprising:
   a housing having at least one bearing;
   a bearing having an inner race and an outer race disposed in said at least one bearing seat;

a sleeve disposed between one of an inner and outer races of said bearing and said bearing seat, bonded to said housing;

a spindle mounted on another one of the inner and outer races wherein said spindle is axially aligned relative to said bearing and said spindle and bearing are displaceable axially relative to said sleeve; and wherein said sleeve is bonded to said housing with a metal-to-metal adhesive bonding material.

2. A spindle assembly according to claim 1 wherein said material is a epoxy resin adhesive.

3. A spindle assembly according to claim 1 wherein said spindle is provided with means for gripping a tool holder.

4. A spindle assembly according to claim 1 wherein said housing includes a pair of spaced bearing seats in which there are disposed a pair of axially spaced bearings.

5. A spindle assembly according to claim 1 wherein said housing is provided with an opening having an enlarged section defining said at least one bearing seat, the outer race of said bearing is disposed in said at least one bearing seat, said sleeve is disposed between said outer race of said bearing and said at least one bearing seat and is bonded to said housing and said spindle is received within said opening and journaled in the inner race of said bearing.

6. A spindle assembly according to claim 5 wherein said sleeve is bonded to said housing with a metal-to-metal adhesive bonding material.

7. A spindle assembly according to claim 5 wherein said enlarged section is provided with a annular wall, said sleeve is provided with an annular configuration, said outer bearing race is received within said annular sleeve and is bonded to said annular wall of said enlarged section of said opening.

8. A spindle assembly according to claim 5 wherein said spindle is provided with means for gripping a tool holder.

9. A spindle assembly according to claim 5 wherein said opening in said housing includes a pair of spaced, enlarged sections defining bearing seats, and the outer race of the bearing is disposed in each of said baring seats and a sleeve is disposed between each outer race of a bearing and an adjacent annular wall of an enlarged section of said housing.

10. A method of fabricating a spindle assembly for a machine tool comprising:

forming at least one bearing seat in a housing;

mounting a spindle on one of an inner race and an outer race of a bearing;

mounting a sleeve on the other of said races of said bearing so that said bearing is displaceable axially relative to said sleeve and positioned between one of an inner and outer races of said bearing and said bearing seat;

applying an adhesive bonding material to at least one of a surface of said sleeve and a surface of said at least one bearing seat;

mounting said spindle with said bearing and sleeve, on said housing so that said surface of said sleeve is disposed adjacent to said surface of said bearing seat with said adhesive bonding material adjoining said surfaces; and allowing said bonding material to set to rigidly secure and sleeve to said housing, permitting said bearing to displace along an axial line of travel relative to said sleeve.

11. A method according to claim 10 including forming said at least one bearing seat slightly oversized relative to said sleeve.

12. A method according to claim 11 wherein an amount of oversize is in a range between 0.010 to 0.015 inches.

13. A method according to claim 10 including press fitting said inner race onto said spindle.

14. A method according to claim 10 including:

forming first and second bearing seats in said housing;

mounting said spindle on one of an inner race and an outer race of a first bearing;

mounting a first sleeve on another one of said inner and outer races of said first bearing so that said first bearing is axially displaceable relative to said first sleeve;

applying an adhesive bonding material to at least one surface of said first sleeve and a surface of said first bearing seat;

mounting said spindle with said first bearing and first sleeve, on said housing so that said first sleeve is disposed adjacent said first bearing seat with said adhesive bonding material therebetween;

mounting a second sleeve on one of an inner and outer race of said second bearing so that said second bearing is axially displaceable relative to said second sleeve;

applying an adhesive bonding material on at lest one of a surface of said second sleeve and a surface of said second bearing seat;

mounting another one of said inner and outer races of said second bearing on said spindle and said second bearing with said second sleeve in said second bearing seat with said adhesive bonding material between said second sleeve and said second bearing seat; and allowing said adhesive bonding materials to set to rigidly secure said sleeves to said housing, permitting said bearings to displace along an axial line of travel relative to said spindle, relative to said sleeve.

15. A method of fabricating a spindle assembly for a machine tool comprising:

providing a housing having an opening therethrough with spaced, first and second enlarged sections providing outwardly facing annular seating surfaces and annular side walls;

mounting a first annular sleeve on an outer race of a first bearing so that said first bearing is axially displaceable relative to said first sleeve;

mounting said first bearing with said first sleeve disposed thereon onto a spindle having an annular seating surface so that an inner race of said first bearing seats on said annular seating surface of said spindle;

applying an adhesive bonding material on at lest one of a surface of said second sleeve and a surface of said second bearing seat;

mounting said second baring with said second sleeve disposed thereon, on said spindle disposed in said housing opening so that said second bearing is received in said second enlarged section, the outer race of said second bearing is seated on said annular surface of said second enlarged section and said second sleeve is disposed adjacent the annular side wall of said second enlarged section, with said adhesive bonding material dispose therebetween; and allowing said adhesive bonding materials to set to rigidly secure said sleeves to said housing, permitting said spindle to displace along an axial line of travel relative to said housing.

16. A method according to claim 15 wherein the inner races of said bearings are press fit onto said spindle.

17. A method according to claim 15 wherein a spacer tube is provided on said spindle between the inner races of said bearings.

18. A method according to claim 15 wherein a nut is threaded onto an end of said spindle for retaining said spindle and bearings within said housing opening.

19. A method according to claim 15 wherein a cover plate is provided engaging the outer race of said first bearing.

* * * * *